(12) United States Patent
Bouzin et al.

(10) Patent No.: US 12,173,760 B2
(45) Date of Patent: Dec. 24, 2024

(54) COUPLING GUARD FOR A ROTATING MEMBER

(71) Applicant: Dresser-Rand SAS, Seine-Maritime (FR)

(72) Inventors: Axel Bouzin, Brest (FR); Frededric Marteau, Octville sur Mer (FR); Yann Peignet, Saint Maclou (FR)

(73) Assignee: Dresser-Rand SAS, Seine-Maritime (FR)

(*) Notice: Subject to any disclaimer, the term of this patent is extended or adjusted under 35 U.S.C. 154(b) by 171 days.

(21) Appl. No.: 17/910,818

(22) PCT Filed: Feb. 22, 2021

(86) PCT No.: PCT/EP2021/054300
§ 371 (c)(1),
(2) Date: Sep. 11, 2022

(87) PCT Pub. No.: WO2021/185533
PCT Pub. Date: Sep. 23, 2021

(65) Prior Publication Data
US 2023/0095573 A1    Mar. 30, 2023

(30) Foreign Application Priority Data
Mar. 17, 2020   (EP) .................................. 20290030

(51) Int. Cl.
*F16D 3/84*     (2006.01)
*F01D 25/14*    (2006.01)

(52) U.S. Cl.
CPC ............. *F16D 3/843* (2013.01); *F01D 25/14* (2013.01); *F05D 2260/20* (2013.01); *F05D 2260/40* (2013.01)

(58) Field of Classification Search
CPC ................................. F16D 3/843; F01D 25/14
See application file for complete search history.

(56) References Cited

U.S. PATENT DOCUMENTS 9,920,651 B2 *   3/2018   Cherolis ................... F02C 7/12
10,584,611 B2 *  3/2020   Pelella ..................... F01D 25/12
(Continued)

FOREIGN PATENT DOCUMENTS

CN    105849367 A    8/2016
CN    105992927 A    10/2016
(Continued)

OTHER PUBLICATIONS

PCT International Search Report and Written Opinion of International Searching Authority mailed Apr. 12, 2021 corresponding to PCT International Application No. PCT/EP2021/054300 filed Feb. 22, 2021.

*Primary Examiner* — Courtney D Heinle
*Assistant Examiner* — John S Hunter, Jr.
(74) *Attorney, Agent, or Firm* — Wolter Van Dyke Davis, PLLC (57) ABSTRACT

A coupling guard for a rotor, which includes a housing for enclosing the rotor in an inner space of the housing, the housing extending longitudinally along a length of the rotor; a ventilation system for creating a flow of gas in the inner space from a gas inlet to a gas outlet that exhausts outside. The gas inlet includes a pipe extending along a pipe longitudinal axis from outside to inside the housing. The pipe includes a first opening located outside the housing and a second opening located inside the housing in the inner space. The pipe has the second opening close to the rotor when the housing encloses the latter. The second opening has a curved edge wherein a projection of the curved edge onto a plane extending parallel to the longitudinal axis of the pipe and parallel to the axis of longitudinal extension is a segment of curve.

9 Claims, 5 Drawing Sheets

(56) References Cited

U.S. PATENT DOCUMENTS

| | | |
|---|---|---|
| 2005/0160723 A1 | 7/2005 | Seipler |
| 2016/0223030 A1 | 8/2016 | Dunning |
| 2016/0281508 A1 | 9/2016 | Pelella et al. |
| 2016/0334175 A1 | 11/2016 | Eckert |
| 2017/0145844 A1 | 5/2017 | Jamiolkowski |
| 2019/0247823 A1 | 8/2019 | Naef et al. |
| 2020/0032941 A1 | 1/2020 | Tiberghien |

FOREIGN PATENT DOCUMENTS

| | | |
|---|---|---|
| CN | 106438046 A | 2/2017 |
| CN | 106907197 A | 6/2017 |
| CN | 110778828 A | 2/2020 |
| JP | 5940569 B2 | 6/2016 |

\* cited by examiner

FIG 7B side view | front view

COUPLING GUARD FOR A ROTATING MEMBER

CROSS REFERENCE TO RELATED APPLICATIONS

This application is the US National Stage of International Application No. PCT/EP2021/054300 filed 22 Feb. 2021, and claims the benefit thereof. The International Application claims the benefit of European Application No. EP20290030 filed 17 Mar. 2020. All of the applications are incorporated by reference herein in their entirety.

FIELD OF INVENTION

The invention relates to the technical field of coupling guards and concerns more precisely the ventilation of coupling guard for a rotating coupling member.

BACKGROUND OF INVENTION

Various machines, like turbomachines and the like, may comprise a couple of rotating assemblies for the transmission of rotational power from a driver device to a driven device. Typically, the rotating assembly of the driven device is driven into rotation by the rotating assembly of the driver device through a rotating coupling member which connects both rotating assemblies. The rotating coupling member (or coupling rotor) is usually enclosed within a coupling guard notably for safety reasons as required by regulations and standards. During working of the machine, the temperature of the air enclosed in the coupling guard and surrounding the rotating coupling member increases and requires therefore a ventilation system for cooling down the rotating coupling member and associated enclosure, distributing the heat inside the coupling guard (in order to avoid for instance local high temperature points), and transferring the heat outside of the coupling guard.

Existing ventilation systems comprise usually one or several air inlets and one or several air outlets, wherein pressure differences inside the coupling guard and resulting from the rotation of the rotating coupling member is used for creating an air flow from the air inlet to the air outlet(s). Known in the art techniques are actually based on the use of scoops (for air flowing inside the coupling guard) and baffles (for directing the air outside of the coupling guard) mounted on an internal wall of the coupling guard and configured for improving the circulation of air from the air inlet to the air outlet(s). At time being, such ventilation systems are complex to implement, results are not systematically repetitive and consequently the associated costs are very variable with equivalent inputs.

SUMMARY OF INVENTION

An objective of the present invention is to propose a simple and efficient ventilation system for a coupling guard which avoids the use of scoops, and whose production costs (e.g. material quantity, etc.) are as low as possible.

This objective is solved by the measures taken in accordance with the independent claims. Further advantageous embodiments are proposed by the dependent claims.

The present invention concerns a coupling guard for a rotating coupling member, e.g. a rotor, the coupling guard comprising: —a housing configured for enclosing the rotating coupling member in an inner space of the housing, said housing being configured for extending longitudinally along a length of the rotor around an axis of longitudinal extension of the housing in order to surround at least said length of the rotor; —a ventilation system for creating a flow of gas in said inner space from a gas inlet of said housing to at least one gas outlet of said housing in order to cool down the rotating coupling member and in particular its surrounding environment enclosed in the housing. The ventilation system is notably configured for created a circulation of said gas from the gas inlet to said at least one gas outlet through said inner space; characterized in that the gas inlet comprises a pipe extending along a pipe longitudinal axis from outside to inside the housing towards the rotating coupling member when the housing encloses the latter, said pipe being notably free of contact with said rotating coupling member, said pipe comprising a first opening located outside the housing and a second opening located inside the housing in said inner space for ensuring a flow of gas from the first opening to the second opening, wherein a projection of the second opening on a plane extending parallel to the longitudinal axis of the pipe and parallel to the housing axis of longitudinal extension comprises at least one curve segment. Indeed, according to the present invention, the second opening comprises at least a curved edge, wherein the projection of said curved edge onto the above-mentioned plane results in said curve segment. In particular, said curved edge is a segment of curve extending continuously from a first point to a second point while passing by a point M located between said first point and said second point, wherein the point M is the point of the segment of curve which is configured for being the farthest from the rotational axis of the rotating coupling member (otherwise said, it is also the closest to the housing internal wall when the distance is measured radially from the rotational axis of the rotating coupling member) and the first point and the second point being configured for being located closer to said rotational axis with respect to the point M. Preferentially, the segment of curve is symmetric, i.e. has reflectional symmetry, wherein the point M belongs to a plane of symmetry and the segment of curve going from point M to said first point is symmetric with respect to the segment of curve going from point M to said second point.

According to the present invention, the housing axis of longitudinal extension is notably parallel to the rotational axis of the rotating coupling member when the housing surrounds the rotating coupling member. Preferentially, the pipe comprises at least a straight part extending from outside to inside the housing, wherein said straight part is centered around said pipe longitudinal axis. The second opening is in particular located at the extremity of the pipe inside the housing. Preferentially, said curve segment or curved edge is concave, notably with respect to the first opening (or, otherwise said, notably with respect to closest inner wall of the housing that is configured for surrounding the rotating coupling member). Preferentially, said curved edge is a part of an ellipse or a parabola. In particular, the second opening is also symmetric with respect to a plane extending perpendicularly to said housing axis of longitudinal extension and passing through the middle of the pipe, e.g. comprising the pipe longitudinal axis. Preferentially, said projection has the shape of a half-ellipse, or of a parabola, or of a complete ellipse. Advantageously, the shape of the second opening ensures a best repartition of forces and constraints exerted at the extremity of the pipe during the machine working, which enables to decrease the thickness of the tube, and thus save material, while satisfying a required rigidity for said pipe and its second opening.

According to the present invention, at least a portion of the second opening defined or delimited by said curved edge opens in direction of or is directed towards a direction that is the direction of rotation of the rotating coupling member when the coupling guard is installed on the machine. In other words, the pipe is installed with respect to the housing so that, when the housing encloses the rotating coupling member, then a gas flow circulating substantially circularly or spirally around the rotating coupling member contacts first at least one external curved surface of the pipe (or a leading edge) bevor reaching afterwards the curved edge of the second opening (which is a trailing edge with respect to the flow of gas rotating around the rotor), wherein the second opening is disposed opposite to said external curved surface. According to this configuration of the second opening with respect to said external curved surface of the pipe, gas streamlines are first forced to flow symmetrically around said external curved surface of the pipe, streamlines of gas being therefore forced to separate, and then, after reaching the second opening, the separated streamlines reassemble, creating at the same time a pressure difference in front of said second opening and with respect of the first opening, wherein said pressure difference makes the gas flowing from said first opening to the second opening when the rotating coupling member rotates around its rotational axis.

According to the present invention, said curved edge might be obtained as an intersection of a plane with the pipe, wherein said plane is parallel to the housing axis of longitudinal extension and tilted with respect to the longitudinal axis, wherein the tilting angle is an acute angle. According to another embodiment, said curved edge might be obtained as an intersection of an ellipse with the pipe. According to preferred embodiments, the pipe comprises a straight part extending from outside the housing to inside said housing, preferably radially with respect to the rotating coupling member (e.g. with respect to its rotational axis). Preferentially, the straight part inside said housing directly ends with said second opening. According to another embodiment, said straight part inside said housing is coupled at its end inside the housing with a curved part of the pipe curved in the direction of the rotation direction of the rotating coupling member when the latter is installed in said housing. In this case, the curved part of the pipe ends with said second opening. Preferentially, said straight part extends from the first opening to the second opening or to its coupling to the curved part. In both cases, the second opening is located close to the rotating coupling member.

Preferentially, in the case wherein the straight part ends directly with said second opening, then the latter is obtained by truncation of the ends of said straight part, i.e. of the pipe straight part, said truncation being for instance obtained from the intersection of an ellipsoid with the pipe straight part inside the housing, so that a beveled shape, e.g. an arched beveled shape, is obtained for the second opening of the pipe. Preferentially, in the case of the pipe having a straight part coupled at its end with said curved pipe part and ending by the latter, then said curved pipe part comprises a truncated cone and a curved/bent portion, wherein the second opening is formed by the open base of the truncated cone (i.e. a cone whose apex has been removed), wherein the open apex of the cone is coupled to one extremity of said curved portion, the other extremity of said curved portion of pipe being coupled to the straight part. The truncated cone is preferentially centered around a cone axis that forms an angle comprised between 40-55° with respect to a longitudinal axis around which the straight part is centered. Said angle is for instance also the angle between the cone axis and a plane extending parallel to the axial length of straight part of the pipe and parallel to a housing axis of longitudinal extension of the housing, i.e. parallel to the rotating coupling member when the housing surrounds the latter.

The present invention concerns also a rotating machine comprising a first rotating assembly, a second rotating assembly, and a rotor coupling the first rotating assembly to the second rotating assembly, wherein the rotor is enclosed within a coupling guard as previously described.

BRIEF DESCRIPTION OF THE DRAWINGS

Further description and details of the invention will be described now on the basis of embodiments illustrated by the following figures.

DETAILED DESCRIPTION OF INVENTION

Figure 1:
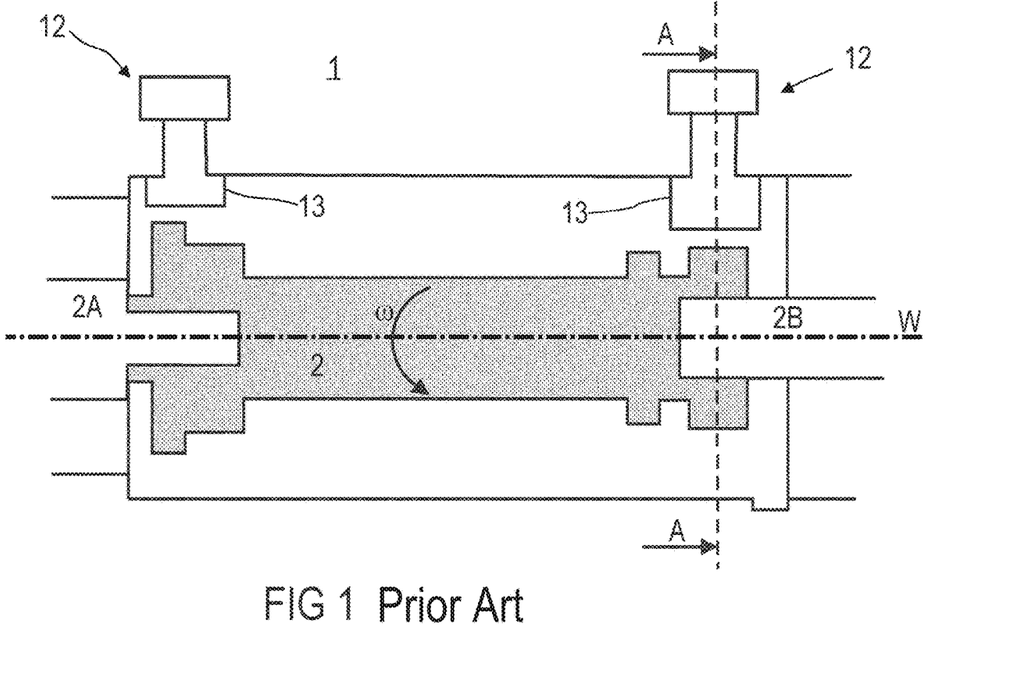
FIG. 1 Cross sectional front view of a schematic representation of a prior art ventilation system of a coupling guard.
Figure 2:
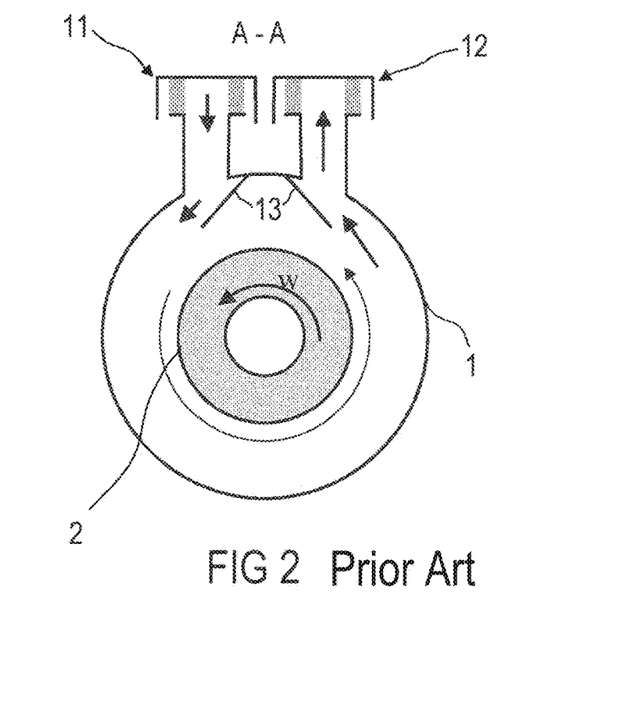
FIG. 2 Cross sectional side view of the schematic representation of the coupling guard according to FIG. 1 taken along the line A-A.

FIGS. 1 and 2 show a prior art coupling guard 1 according to a cross sectional front view (FIG. 1) and side view (FIG. 2). The coupling guard 1 is configured for surrounding and enclosing a rotating coupling member 2 (hereafter simply called rotor) which is typically used for the transmission of rotation power from a first rotating assembly 2A to a second rotating assembly 2B. The coupling guard 1 comprises a ventilation system made of one or several gas (air) inlets 11 and outlets 12, wherein air coming from the outside of the coupling guard 1 enters into the latter through the gas inlet 11, is driven (see the arrows in FIG. 2) into rotation around the rotor 2 by the rotation of the latter around its rotational axis W according to a rotational speed w (due to friction force, the air inside the housing 10 is driven into rotation by the rotating surface of the rotor 2) and then leaves at some time the inner space of the coupling guard 1 through the air outlet 12. In order to improve the air circulation, scoops 13 are used for directing the flows of incoming and leaving air. This circulation of air inside the coupling guard enables to decrease the temperature of the surrounding environment of the rotor 2.

Figure 3:
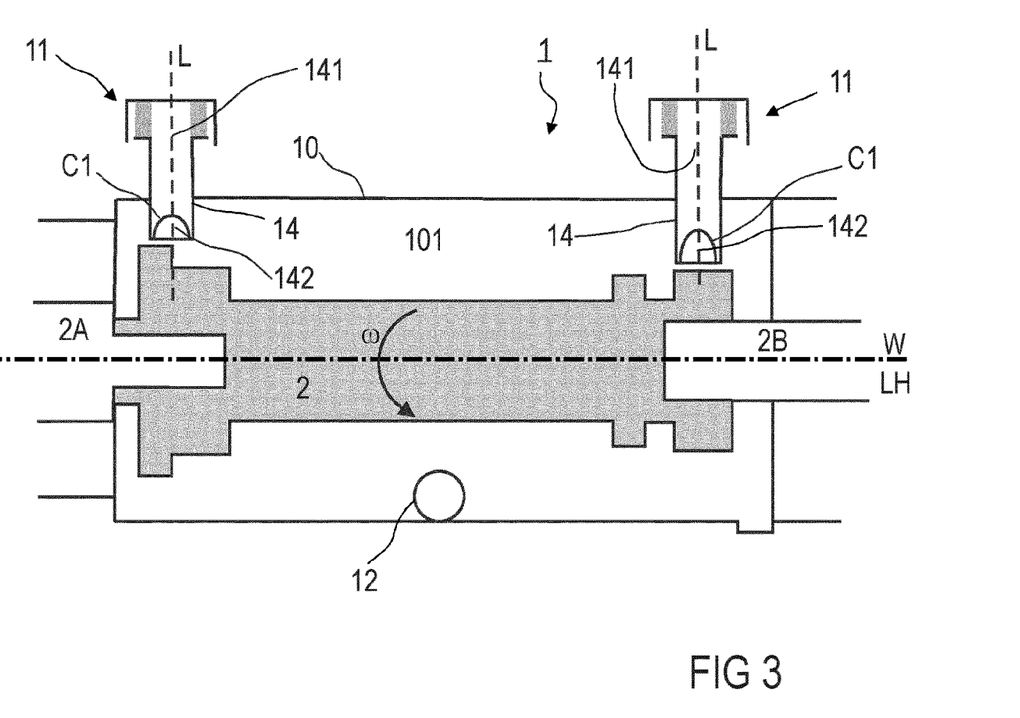
FIG. 3 Schematic representation of a coupling guard according to the invention (Front view).

FIG. 3 shows a schematic front view of a coupling guard 1 according to the invention, wherein the same reference numbers have been taken for features identical or having the same function as those described in FIGS. 1 and 2. The coupling guard 1 comprises a housing 10 configured for surrounding and enclosing the rotor 2 so as to create an enclosed inner space 101 in which a flow of gas circulates from a gas inlet 11 to one or several gas outlets 12 of a ventilation system. The housing is preferably configured for being substantially centered around a rotor 2, and therefore around an axis of longitudinal extension LH that might be identical to the rotational axis w of the rotor 2, so as to surround at least partially a length of the rotor 2. The walls of the housing 10 define the boundaries of said inner space 101 inside which the rotating coupling member is enclosed. The housing 10 is preferentially substantially cylindrical. According to the present invention, the housing 10 comprises preferentially two gas inlets 11, namely a first gas inlet installed close to one of the longitudinal extremities of the housing 10 and a second gas inlet installed close to the other longitudinal extremities of the housing. According to other preferred embodiment, the housing 10 may comprise only one or more than two gas inlets 11 installed along the housing 10. For instance, a single or several gas inlets 11 might be located substantially in the middle of the housing 10 with respect to its length, and one or several gas outlets 12 might be each located at one extremity of the housing 10 with respect to its length, preferentially at least one gas outlet 12 located at each extremity of the housing 10 substantially located radially with respect to the coupling of the rotor 2 with the rotating assemblies 2A or 2B. According to FIG. 3, the two gas inlets 11 are preferentially aligned on a same longitudinal line extending from one of said extremities of the housing to the other one. For instance, the first gas inlet 11 is installed substantially above or close to the coupling of the rotor 2 with the first rotating assembly 2A and the other gas inlet 11 is installed substantially above or close to the coupling of the rotor 2 with the second rotating assembly 2B when the housing surrounds the rotor 2. Preferably, the housing comprises a single gas outlet 12 located at equal distance from each of the gas inlets 11, i.e. substantially in the middle of the housing 10 with respect to its length, and preferentially at a position radially opposite to the position of the gas inlets 11, e.g. typically at the bottom of the housing while the gas inlets are mounted on the top of the housing 10 (i.e. substantially above the rotor 2) when the housing 10 surrounds the rotor 2.

According to the present invention, the gas inlet 11 comprises a pipe 14, preferentially substantially cylindrical, extending from outside to inside the housing 10 through the housing wall along a longitudinal axis L parallel to at least a part of its axial length. One extremity of the pipe 14 is therefore located on the external side of the housing 10 and another extremity is located within the inner space 101 defined by the housing 10, i.e. on the internal side of the housing 10. The pipe 14 is preferentially a straight pipe. In particular, the longitudinal axis L of the pipe 14 extends towards the rotor 2, e.g. radially towards the rotor 2, preferentially centered one the rotational axis W of the rotor 2 (e.g. an extension of the longitudinal axis L intersecting the rotor 2 or the rotational axis W), or might be off centered with respect to the rotor 2 or its rotational axis W (in this case, the distance between the longitudinal axis or its extension and the rotational axis W being greater than the radius of the rotor so that an extension of the pipe along the longitudinal axis would not enter into contact with the rotor 2). Preferentially, the pipe 14 is installed on the top of the housing 10, i.e. vertically above the rotational axis of the rotor 2 when the housing 10 surrounds the latter. The extremity of the pipe 14 located outside the housing 10 comprises a first opening for letting a gas entering within the inner space 101 of the housing, said gas flowing therefore from outside the housing to inside the housing. Said gas can be air at atmospheric pressure surrounding the coupling guard 1 or gas comprised within a closed chamber outside from the housing and connected to the first opening of said pipe 14.

The pipe 14 further comprises a second opening 142, which is preferentially close to the rotor 2, e.g. close to a coupling of the rotor 2 with one of said first or second rotating assembly 2A, 2B, and preferably free of contact with the rotor 2. The second opening 142 is located inside the housing 10, within said inner space 101 for ensuring a circulation of the gas which enters by the first opening 141, flows then inside the pipe 14 until reaching the second opening 142, and leaves said pipe 14 through said second opening 142 in order to enter the inner space 101. The gas entering the inner space 101 through said second opening 142 is then driven into rotation by the rotor 2 when the latter rotates around its rotational axis W according to a rotational speed w, and finally, exhausts through the gas outlet 12, enabling therefore to cool down the inner space 101. Indeed, the temperature of the gas entering the inner space 101 is lower than the temperature of the gas exhausted by the gas outlet 12, enabling therefore a cooling of the rotor 2 and its surrounding environment enclosed within the housing 10. According to the present invention, the second opening 142 comprises at least a curved edge C1, i.e. the boundary line of the pipe surface at the location of the second opening comprises at least a curved part.

Figure 7A:
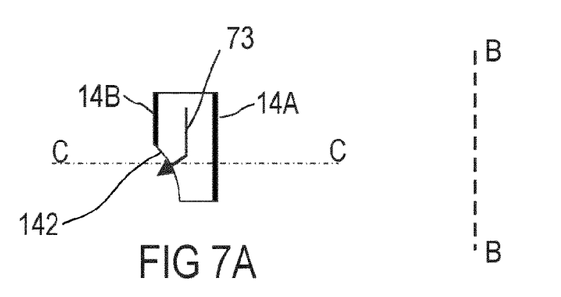
FIGS. 7A-B Side view of a pipe according to the invention (FIG. 7A) and schematic illustration of streamlines (FIG. 7B) of gas flowing around the pipe according to a top view along the line C-C of FIG. 7A.
Figure 7B:
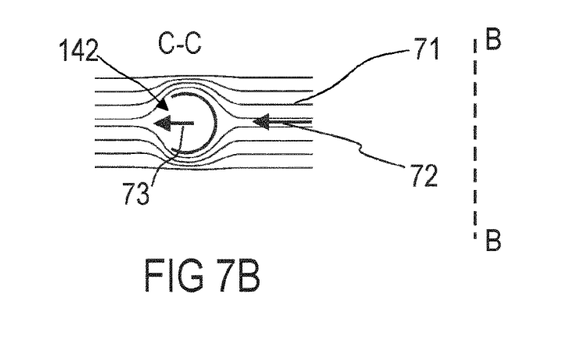

The pipe 14 is fixed to the housing 10 so that its second opening 142 is directed in the same direction as the direction of rotation (given by the rotational speed w) of the rotor 2 when the housing 10 encloses the latter (it does not open in a direction opposite to the direction of rotation of the rotor 2). Otherwise said, the pipe 14 comprises a leading edge 14A and a trailing edge 14B (see FIGS. 4A, 4C, 4E, and 5-7A) which includes the curved edge C1, wherein the leading edge 14A faces and contacts first the flow of gas during rotation of the rotor 2, said flow of gas having to flow from the leading edge 14A to the trailing edge 14B when rotating around the rotational axis W of the rotor 2 during the rotation of the latter, the trailing edge 14B being opposite to the leading edge 14A (notably with respect to a cross sectional view passing longitudinally through the middle of the pipe and perpendicularly to the longitudinal axis of the housing 10, i.e. perpendicularly to the rotational axis W of the rotor 2 when the housing encloses the latter). According to the pipe 14 position and shape with respect to the housing 10 and the rotor 2, and as shown in FIG. 7A and 7B which show a pipe according to the invention respectively from a side view and top view, streamlines 71 of gas flow (the flow direction is schematically represented by the arrow 72) separate in front of the leading edge 14A for joining together after the trailing edge 14B, creating in front of the second opening 142, more precisely in front of the curved edge C1, a negative pressure with respect to the pressure at the first opening 141, this pressure difference between the first opening 141 and the second opening 142 creating a flow of gas from the first opening 141 to the second opening 142 inside the inner space 101 as schematically shown by arrow 73 in FIG. 7A and 7B.

Figure 4A:
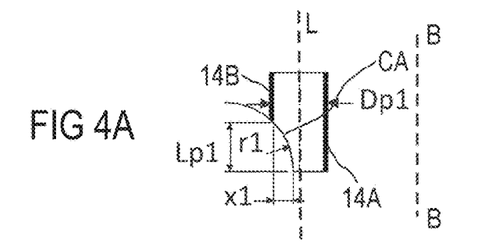
FIG. 4A to FIG. 4F Exemplary embodiments of the second opening according to the invention.
Figure 4B:
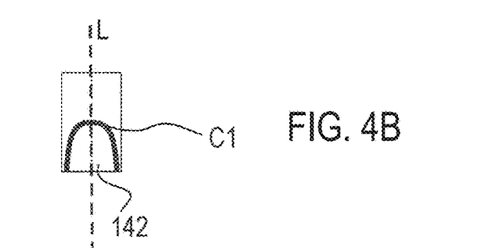
Figure 4C:
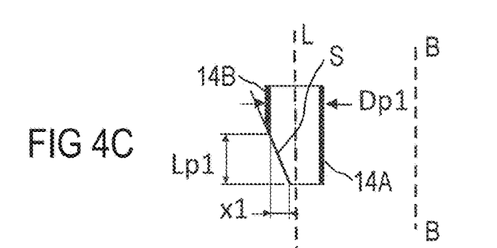
Figure 4D:
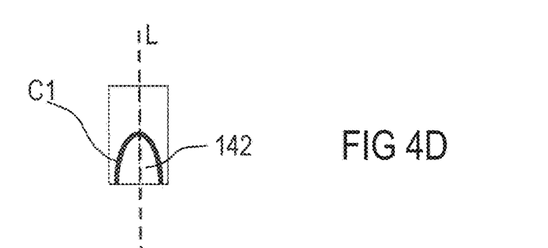
Figure 4E:
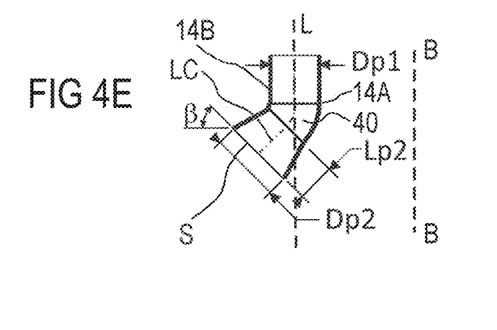
Figure 4F:
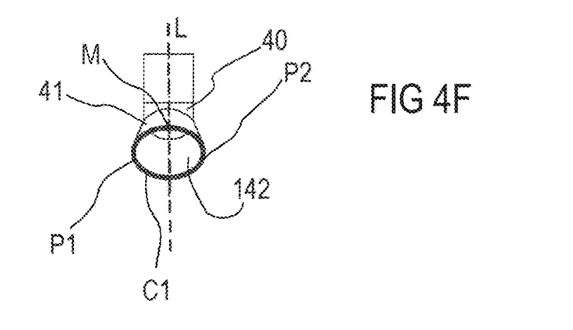
Figure 5:
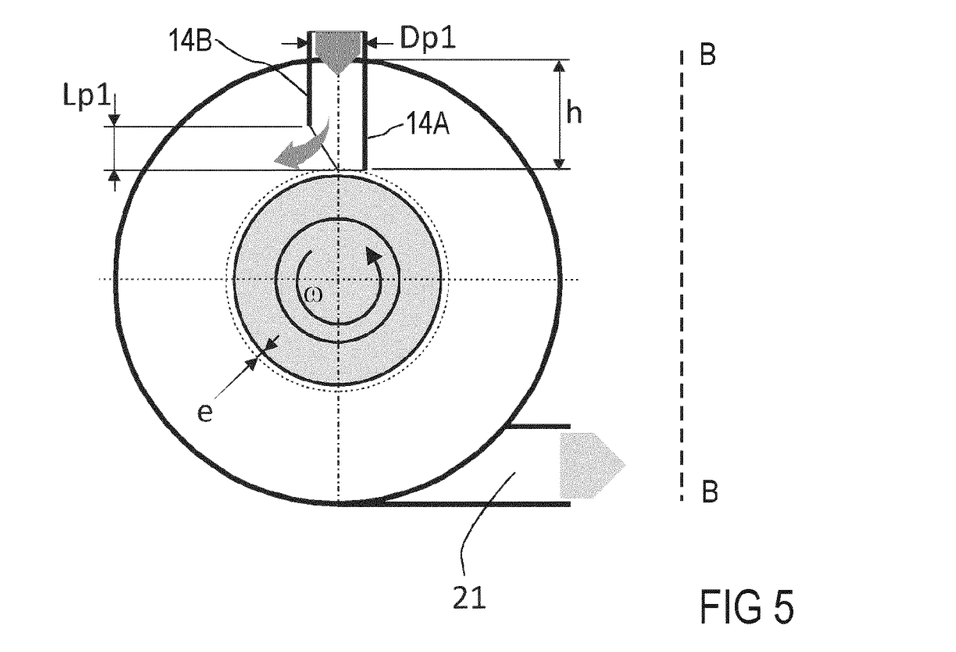
FIG. 5 Schematic illustration of a first preferred embodiment of a pipe according to the invention (Side view).
Figure 6:
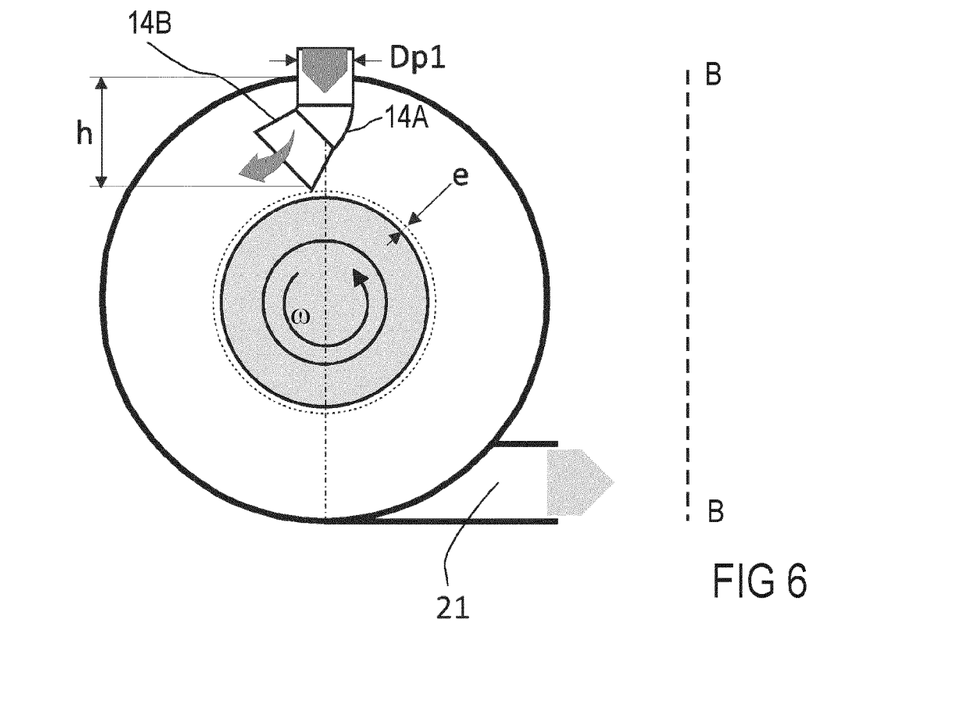
FIG. 6 Schematic illustration of a second preferred embodiment of a pipe according to the invention (Side view).

According to the present invention, the orthogonal projection of the curved edge C1 of the second opening 142 onto a plane B (represented by line B-B in the side views of FIGS. 4A, 4C, 4E, and 5-7A) extending parallel to the longitudinal axis L of the pipe 14 and parallel to the rotational axis W of the rotor 2 when the housing 10 surrounds the latter is a segment of curve (see for instance the front views of pipes according to the invention presented in FIGS. 4B, 4D, and 4F). Additionally, a projection of the second opening 142, in particular of its curved edge C1, onto a plane perpendicular to the plane B and extending parallel to the longitudinal axis L, i.e. perpendicular to the rotational axis W of the rotor 2, comprises either a straight segment S titled with respect to the longitudinal axis L or a concave segment CA with respect to said longitudinal axis L.

FIGS. 4A-4B, FIGS. 4C-4D, and FIGS. 4E-4F respectively show three different preferred embodiments of the second opening 142 for the pipe 14 according to the invention. For each of the three embodiments, a side view is presented on the left and a corresponding front view on the right. In each case, the pipe 14 comprises a straight part surrounding the longitudinal axis L. According to the two embodiments shown in FIGS. 4A-4B, and FIGS. 4C-4D respectively, said straight part directly ends with the second opening 142. According to the embodiment shown in FIGS. 4E-4F, the straight part is coupled at its end with a curved pipe part curved in a direction substantially parallel to the direction of rotation of the rotor 2, said curved pipe part ending then with the second opening 142. For the three embodiments of FIGS. 4A-4F, a projection (i.e. orthogonal projection) of the curved edge C1 of the second opening 142 onto a plane parallel to the longitudinal axis L and to the rotational axis W (which is also the longitudinal axis along which the housing 10 extends) is a concave segment of curve.

Figure 8:
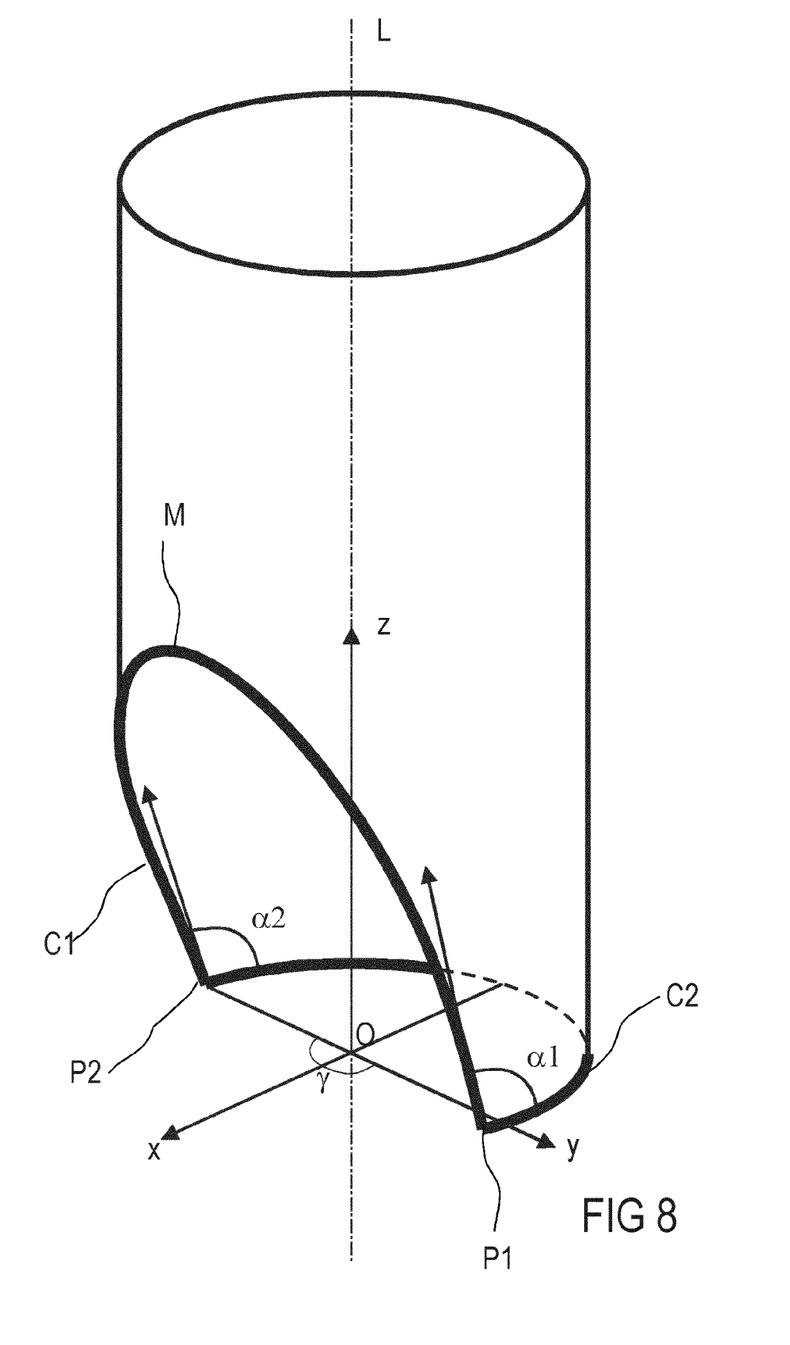
FIG. 8 Schematic illustration of the details of a second opening according to the invention.

In each case and as shown in FIG. 8, said second opening 142 comprises at least one curved edge C1 which is a segment of curve extending continuously from a first point P1 to a second point P2 while passing by a point M that is the point of the segment of curve that is the closest to the first opening 141 with respect to the first point P1 and to the second point P2 which are in particular configured for being closer to the rotor 2 compared to the point M (the point M is typically an "extremum" of the segment of curve with respect to a Cartesian coordinate system x,y,z as shown in FIG. 8, wherein the z-axis extends along the longitudinal axis L, and the x- and y-axis define a plane perpendicular to the z-axis), wherein the tangent to the segment of curve at the first point P1 and respectively at the second point P2 makes an angle $\alpha 1$ and respectively $\alpha 2$, with a plane perpendicular to the longitudinal axis L, with $\alpha 1$ and $\alpha 2$ being different from 0. In other words, each of said tangents at P1 and P2 is tilted with respect to said plane perpendicular to the longitudinal axis L of the pipe 14. Preferentially, $\alpha 1=\alpha 2$ and the segment of curve (i.e. the curved edge C1) is symmetric with respect to a plane comprising the longitudinal axis L and the point M. Preferably, the segment of curve [P1,M] has the same length as the segment of curve [P2,M]. Preferentially, among all points forming said curved edge C1 extending from P1 to P2 (of course, P1 is different from P2 and M, and P2 is different from M), only the tangent to the segment of curve at the point M is parallel to said plane perpendicular to the longitudinal axis L. The curved edge C1 is thus a continuous segment of curve extending from the first point P1 and from the second point P2, notably symmetrically, to the point M. This continuity of the curved edge C1 improves the stiffness of the second opening 142, so that the thickness of the wall of the pipe 14 can be minimized, sparing therefore material and decreasing the costs of production of the pipe 14.

Preferentially, in the case wherein the straight part ends directly with said second opening 142, then the curved edge C1 is obtained by truncation of the end of said straight part, i.e. of the pipe straight part, wherein the curved edge C1 corresponds to the intersection of the end of the straight part with an ellipsoid, like a sphere, or with a plane. In other words, a portion of the pipe 14 extending from the end of the straight part until the curved edge C1 has been removed from the pipe 14, creating therefore the opening 142. The curved edge C1 is preferentially obtained by slicing the end of the pipe with a plane or an ellipsoid like a sphere. The result of this truncation is a pipe 14 whose end inside the housing is characterized by the second opening 142 having a beveled shape, e.g. an arched beveled shape. According to this configuration, the curved edge C1 characterizing the beveled end pipe shape is concave. Preferentially, said curved edge C1 connects with a second segment C2 of curve (see FIG. 8), for instance the second curve segment C2 extending from the point P1 to the point P2 in a plane perpendicular to the longitudinal axis L. Said second curve segment C2 is therefore a portion of the second opening 142 that lies in a plane substantially perpendicular to the longitudinal axis. Preferentially, the angles a1 and a2 at respectively the points P1 and P2 defined between the tangent to the curved edge C1 (i.e. the segment of curve "C1") and the tangent to the second curve segment C2 at both points P1 and P2 are comprised between $90°\leq a1$, $a2\leq 160°$, with preferentially a1 and/or a2 strictly greater than 90°. According to these preferred embodiments, the second opening 142 comprises thus a first portion including the curved edge C1 and a second portion including the second segment of curve C2, wherein the curved edge C1 of the second opening 142 is substantially beveled/tilted with respect to the longitudinal axis L and the segment of curve C2 of said second portion is substantially perpendicular to the longitudinal axis L. According to the two preferred embodiments shown in FIGS. 4A-4B and FIGS. 4C-4D respectively (see also FIG. 5 and FIG. 8), at least one of the following structural constructions might be chosen:

$0.8\cdot Dp1\leq Lp1\leq 1.2\cdot Dp1$, wherein Dp1 is the diameter of the pipe straight part and Lp1 is the height of the second opening 142, or of its curved edge C1, as projected onto the longitudinal axis L; and/or $Lp1\leq h$, wherein h is length of the pipe 14 inside the housing and measured along the longitudinal axis L (see FIG. 5); and/or $r1\geq 0.5\cdot Dp1$, wherein r1 is the radius of a sphere used for the truncation of the end of the straight part as shown in the embodiment of FIGS. 4A-4B; and/or $0.3\cdot Dp1\leq x1\leq Dp1$, with preferentially $0.3\cdot Dp1\leq x1\leq 0.9\cdot Dp1$;

$240°\leq g\leq 90°$, wherein g is the angle characterizing the opening of said second opening 142 measured in the plane perpendicular to the longitudinal axis L, having as vertex the intersection O of said plane with the longitudinal axis L, g being the angle at vertex O enclosed by the rays OP1 and OP2 (see FIG. 8).

In the case of the pipe 14 having the straight part coupled at its end with a curved part which makes preferentially the straight part ending by a trumpet/conical shape (see the embodiment of FIGS. 4E-4F), then said second opening 142 is preferably formed by the open base of a truncated cone 41, wherein the open apex of the cone 41 is coupled to a first extremity of a curved/bent pipe portion 40, wherein the other extremity of said curved/bent pipe portion is connected to the straight part, having both the same diameter, while the diameter Dp2 of the second opening 142 is in this case greater that the pipe diameter Dp1. Preferentially, the truncated cone is centered around a cone axis LC that preferentially forms an angle b with $35°\leq b\leq 90$, with preferentially b comprised between 40°-55°. According to this preferred embodiment (shown in FIGS. 4E-4F, and in FIG. 6), at least one of the following structural constructions might be chosen:

$h \geq 1.6 \cdot Dp1$, wherein h is the length of the pipe 14 inside the housing and measured along the longitudinal axis L (see FIG. 6); and/or $Dp1 \leq Dp2 \leq 2 \cdot Dp1$; and/or $0 \leq Lp2 \leq 1.7 \cdot Dp1$, wherein Lp2 is the height of the truncated cone 41. If Lp2=0, then the straight part of the pipe 14 is simply connected to the curved portion 40, the second opening having then a diameter equals to Dp1 and making then the angle b with the plane perpendicular to the longitudinal axis L.

For all embodiments according to the invention, the distance e separating the part of the second opening 142 which is the closest to the rotor 2 from the rotor 2 preferentially satisfies 10 mm≤e≤25 mm.

Finally, and preferentially, at least one, preferentially each, gas outlet 12 is located radially opposite to the gas inlet 11, e.g. at a bottom part of the housing 10 when the gas inlet is located at a top part of the housing 10. Said gas outlet 12 preferentially comprises an exhaust pipe 21 extending perpendicular to the rotational axis w of the rotor 2 and to the longitudinal axis L of the pipe 14 of the gas inlet 11. The exhaust pipe 21 comprises a first opening located inside the housing and configured for collecting a flow of gas and a second opening configured for exhausting said collected flow of gas outside of the housing 10.

The invention claimed is:

1. A coupling guard for a rotor, comprising:
   a housing configured for enclosing the rotor in an inner space of the housing, said housing being configured for extending longitudinally along a length of the rotor around an axis of longitudinal extension of the housing in order to surround at least said length of the rotor;
   a ventilation system for creating a flow of gas in said inner space from a housing gas inlet to a housing gas outlet from which the flow of gas is exhausted outside of the housing;
   wherein the housing gas inlet comprises a pipe extending along a pipe longitudinal axis from outside to inside the housing, said pipe comprising a first opening located outside the housing and a second opening located inside the housing in said inner space, the pipe being configured for having its second opening close to the rotor when the housing encloses the rotor, the second opening comprising at least a curved edge wherein a projection of the curved edge onto a plane extending parallel to the pipe longitudinal axis and parallel to the axis of longitudinal extension is a segment of curve, wherein said curved edge is obtained as an intersection of a plane with the pipe, wherein said plane is parallel to a housing axis of longitudinal extension and tilted of an acute angle with respect to the pipe longitudinal axis,
   wherein the pipe comprises a straight part centered around the pipe longitudinal axis and extending from outside to inside said housing, wherein said straight part has its end inside the housing coupled to a curved part,
   wherein the curved part of the pipe comprises a truncated cone and a curved pipe portion, wherein the second opening is formed by an open base of the truncated cone, wherein an open apex of the truncated cone is coupled to one extremity of said curved pipe portion, an other extremity of said curved pipe portion being coupled to the straight part, and
   wherein the truncated cone is centered around a cone axis that forms an angle β comprised between 40°-55° with respect to the pipe longitudinal axis.

2. The coupling guard of claim 1,
   wherein said curved edge is concave.

3. The coupling guard of claim 1,
   wherein the projection of said curved edge is an ellipse or a parabola.

4. The coupling guard of claim 1,
   wherein said curved edge is symmetric with respect to a plane extending perpendicularly to said housing axis of longitudinal extension and comprising the pipe longitudinal axis.

5. The coupling guard of claim 1,
   wherein a portion of the second opening delimited by said curved edge is configured for pointing or being directed towards a direction that is a direction of rotation of the rotor.

6. The coupling guard of claim 1,
   wherein said curved edge is obtained as an intersection of an ellipse with the pipe.

7. The coupling guard according to claim 1, comprising:
   two housing gas inlets, each installed close to a respective extremity of longitudinal extremities of the housing, and the housing gas outlet located at a same distance from each of the two housing gas inlets and radially at an opposite location.

8. The coupling guard according to claim 1,
   wherein the housing gas outlet comprises an exhaust pipe extending perpendicular to the housing axis of longitudinal extension and to the pipe longitudinal axis.

9. A rotating machine, comprising:
   a first rotating assembly;
   a second rotating assembly;
   a rotor coupling the first rotating assembly to the second rotating assembly; and
   a coupling guard according to claim 1.

* * * * *